Nov. 21, 1939.     R. FARRELL     2,180,511
SPEEDOMETER DRIVE
Filed Dec. 21, 1937
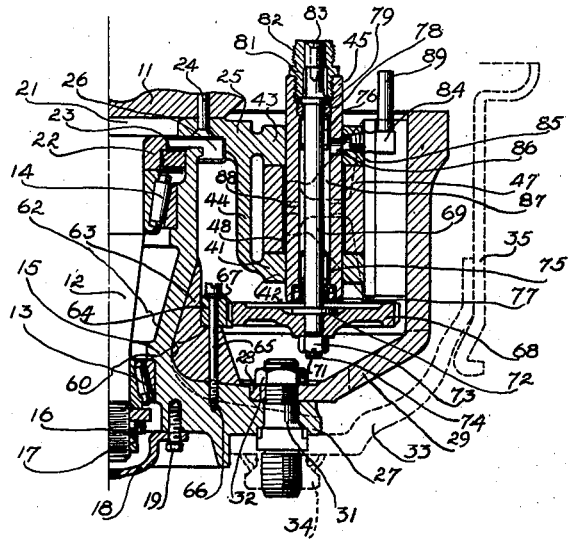
Inventor
Richard Farrell
By Strauch + Hoffman
Attorneys Patented Nov. 21, 1939

2,180,511

UNITED STATES PATENT OFFICE 2,180,511

SPEEDOMETER DRIVE

Richard Farrell, Detroit, Mich.

Application December 21, 1937, Serial No. 181,044

19 Claims. (Cl. 74—12)

My invention relates to vehicle wheel mechanisms and more particularly to means for establishing a drive connection between a wheel and a meter or the like, to be driven thereby when the wheel is rotated.

In the early types of automotive vehicles which were equipped only with brakes at the rear wheels, it was more or less conventional to obtain a drive for the speedometer, odometer or other small driven units from one of the front wheels. Usually the front wheel was supplied with a gear which meshed with another gear at the end of a flexible drive shaft leading to the meter to be driven which was usually mounted on the vehicle dash-board. The purpose of the flexible drive shaft was to take care of steering movement in the front wheel.

When front wheel brakes became standard equipment, it was found that the front wheel brake mechanism interfered with the meter drive from the front wheel and the flexible drive shaft housings soon became worn from contacting brake portions. These facts, coupled with the development of smaller wheels and relatively short shafted meter drive take-offs from the vehicle transmission at the front of the vehicle to reduce the tendency of long meter drive shaft to whip or break, soon resulted in the abandonment of front wheel drive take-offs for such meters.

In the development of heavy motor vehicles such as busses, trucks and others having relatively long wheel bases, it has been found most desirable to mount the motor, transmission and other power drive mechanism at the rear of the vehicle. In such vehicles meters on the dashboard are located a substantial distance from the transmission and drive shaft and a meter drive connection would be unduly long and subject to the objections noted before, where such long shafts were used.

This problem has been solved in the case of such long vehicles by reverting to a front wheel take-off for the meter drive, and developing special means for overcoming the obstructive effect of the brake mechanism or other front wheel control mechanism to such a take-off as described above. While the present invention is described in connection with a front wheel take-off, it is to be understood that it is applicable as well to a rear wheel take-off where the wheel base of the vehicle is such as to permit the use of a meter drive connection of a length within practical limits.

In overcoming the disadvantages of the prior art, it is a major object of my invention to provide a novel drive take-off for a speedometer or the like from a wheel having brake mechanism thereon, the arrangement being such that there is no interference between the meter connection and the braking mechanism and no wear on the meter connection other than that usually encountered.

It is a further object of my invention to provide, in a vehicle wheel assembly wherein convenient access to a rotatable wheel is obstructed by brake mechanism or other control apparatus, novel and readily installed means for transmitting motion of the wheel to a suitable driven connection exteriorly of the brake or control mechanism without interfering with normal operation of that mechanism. This means is as readily applicable to existing installations as well as to new installations.

Still a further object of my invention is to provide brake mechanism embodying a novel meter drive take-off support. Preferably the meter drive is led out through a hollow conduit supported on the brake mechanism which conduit may conveniently be in the form of a hollow brake shoe pivot or anchor to avoid interference with normal brake operation.

A further object of my invention is to provide a novel lubricating arrangement for a brake mechanism embodying a meter drive take-off support.

Still a further object of my invention is to provide a novel brake anchor pin assembly which may be readily substituted for a brake anchor pin assembly in an existing installation or placed in a new installation when it is desired to establish a drive connection for meters or the like from a vehicle wheel.

Further objects of the invention will presently appear as the description proceeds in connection with the annexed drawing in which:

Figure 1 is a side elevation of an embodiment of my invention illustrating an arrangement for actuating a drive connection for a speedometer or the like from a front wheel of the type employing internal brakes.

Figure 2 is a sectional view taken along line 2—2 of Figure 1 and illustrating the hollow brake shoe pivot pin or anchor used to support the speedometer drive connection.

Referring to the drawing wherein like reference characters designate like parts, a yoke 11 which is pivoted upon a steering knuckle at one end of a front axle (not shown), and controlled by a steering mechanism generally designated at 10 in Figure 1, carries a projecting spindle or axle 12. Suitable spaced bearing assemblies 13 and 14 rotatably support a hub 15 upon spindle 12. Hub 15 is prevented from endwise movement on spindle 12 by a suitable locking mechanism, generally designated at 16, cooperating with the threaded end 17 of spindle 12. The projecting end of spindle 12 and the associated locking means are enclosed by a cap 18 removably secured, as by bolts 19, upon hub 15.

Adjacent yoke 11, spindle 12 is provided with an enlarged portion 21 against which is fitted a ring 22 which is secured about spindle 12 by shrinking, or by some other similar process. Lubricant sealing means 23 prevents escape of lubricant from the spindle bearings to the internal brake mechanism to be described later. Surrounding spindle portion 21 and secured to the yoke 11 by rivets, bolts, or other suitable securing means designated at 24, is a web 25 which supports the internal brake mechanism. A sealing ring 26 fills the space between the inner end of hub 15 and the parts mounted on the spindle to further insure against grease leakage to the brake mechanism.

At its outer side hub 15 is provided with a radial flange 27 which is formed at its inner periphery with an annular shoulder 28 upon which the brake drum 29 is seated. Flange 27 is provided with a plurality of circumferentially spaced apertures in each of which is tightly and nonrotatably secured a stud 31 which is threaded at both projecting ends. The inner ends of studs 31 project through aligned apertures in drum 29 and nuts 32 upon the inner threaded stud ends hold brake drum 29 securely upon the hub.

Referring to the drawing wherein like reference characters designate like parts, a yoke 11 which is pivoted upon a steering knuckle at one end of a front axle (not shown), and controlled by a steering mechanism generally designated at 10 in Figure 1, carries a projecting spindle or axle 12. Suitable spaced bearing assemblies 13 and 14 rotatably support a hub 15 upon spindle 12. Hub 15 is prevented from endwise movement on spindle 12 by a suitable locking mechanism, generally designated at 16, cooperating with the threaded end 17 of spindle 12. The projecting end of spindle 12 and the associated locking means are enclosed by a cap 18 removably secured, as by bolts 19, upon hub 15.

Adjacent yoke 11, spindle 12 is provided with an enlarged portion 21 against which is fitted a ring 22 which is secured about spindle 12 by shrinking, or by some other similar process. Lubricant sealing means or oil seal packing 23 prevents escape of lubricant from the spindle bearings to the internal brake mechanism to be described later. Surrounding spindle portion 21 and secured to the yoke 11 by rivets, bolts, or other suitable securing means designated at 24, is a web 25 which supports the internal brake mechanism. A space 26 is preferably provided between the inner end of hub 15 and web 25 to prevent any undue friction between the several parts.

At its outer side hub 15 is provided with a radial flange 27 which is formed at its inner periphery with an annular shoulder 28 upon which the brake drum 29 is seated. Flange 27 is provided with a plurality of circumferentially spaced apertures in each of which is tightly and nonrotatably secured a stud 31 which is threaded at both projecting ends. The inner ends of studs 31 project through aligned apertures in drum 29 and nuts 32 upon the inner threaded stud ends hold brake drum 29 securely upon the hub.

A wheel 33 having aligned apertures fits over the outer ends of studs 31 and is firmly held upon hub 15 by means of nuts 34 mounted upon the threaded outer ends of studs 31. Wheel 33 supports a tire rim 35 in a conventional manner.

Web 25, as shown in Figure 1, is provided with a radially extending boss 36 upon which is rotatably mounted a cam 37, the purpose of which will be later described. Cam 37 is controlled by brake lever mechanism well known in the art, part of which is shown at 40. Substantially diametrically opposite from boss 36, web 25 is provided with an extension 38 which is formed with adjacent substantially circumferentially spaced integral yokes 39 and 41.

Yoke 41, shown in Figure 2, comprises spaced arms 42 and 43, respectively, having aligned apertures. Arm 42 is held in rigid spaced relation upon the web by an axially extending web flange 44. A brake anchor or pivot pin 45 extends between arms 42 and 43 and projects through the apertures beyond the arms at both sides of the yoke. Pin 45 is non-rotatably and fixedly secured in the arm apertures by any suitable securing means.

The external surface of pin 45 intermediate arms 42 and 43 is preferably machined and perfectly cylindrical and serves as a pivot for supporting one end of brake shoe 46. Apertured end portion 47 of brake shoe 46, see Figure 2, fits between arms 42 and 43 and surrounds pin 45. If desired, a replaceable sleeve or bushing 48 of suitable bearing metal may be used to line the aperture of portion 47.

Yoke 39 is provided with a pin 51 upon which is pivoted a brake shoe 52 in the same manner that brake shoe 46 is pivoted upon pin 45. Pin 51 is preferably of the well known type of anchor pin now used in such brake mechanism. The free ends of brake shoes 46 and 52 are provided with rollers 53 and 54, respectively, whose shafts 55 and 56, respectively, are rotatably mounted adjacent the ends of the shoes in such a manner that the periphery of each roller extends a slight distance beyond the ends of the shoes. Adjacent the rollers, shoes 46 and 52 are provided with rigid posts 57 and 58, respectively. To these posts are fastened opposite ends of a resilient spring member 59. Spring 59 tends to pull the free ends of shoes 46 and 52 toward each other and thus maintain rollers 53 and 54 in contact with cam 37.

When cam 37 is rotated counterclockwise, the brake shoes pivot outwardly about pins 45 and 51 and brake surfaces 61 contact the inner periphery of drum 29 to retard rotation of the wheel about the spindle. When cam 37 is turned clockwise, spring member 59 causes the brake shoes to pivot inwardly to release the brake surfaces from drum 29.

It will be seen that the above described brake mechanism substantially fills the available space between hub 15 and brake drum 29 and little or no access can be gained to the inner side of hub 15 without interfering with or at least contacting relatively movable parts of the brake mechanism. The present invention removes the disadvantage of this feature as will now be described.

Hub 15 is usually formed with a gutter portion 62 just inside the lower end of flange 27. In applying my invention to existing installations or new installations, an annular support 63 is mounted in this gutter. This support has its inner periphery shaped to fit closely in the gutter. The outer periphery of support 63 is provided with an annular shoulder 60 forming a seat for annular ring gear 64. Support 63 and ring gear 64 are provided with a plurality of aligned apertures through which extend machine bolts 65 into cooperating threaded holes 66 in hub 15. Pressed between the slotted heads of bolts 65 and ring gear 64 are lock washers 67 so that when bolts 65 are tightened, ring gear 64 and support 63 are securely attached to hub 15. Obviously other types of securing means may be used.

Support 63 may be a continuous ring or a segmental ring or may be made up of a plurality of circumferentially spaced blocks for supporting ring gear 64 at spaced points. Furthermore, if desired, support 63 may be made integral with the wheel hub 15, in which case bolts 65 can be made shorter since they are used only to secure the ring gear. It is also within the principle of the invention to provide an integral wheel formation with teeth or other drive actuating means for the same purpose.

Meshing with gear 64 and adapted to be driven thereby is a pinion 68 which is non-rotatably secured to one end of a shaft 69. Gear 64 and pinion 68 are preferably chamfered at their inner and outer edges respectively for convenience and ease in assembly. Shaft 69 has a threaded end 71 and an enlarged portion 72 which may be an integral formation or may comprise a ring secured, as by shrinking, upon the shaft. The hub of pinion 68 fits closely about shaft 69 and is clamped between enlarged portion 72 and a castle nut 73 upon threaded shaft end 71. Nut 73 is preferably provided with a cotter key 74 to prevent it from accidentally coming loose.

Brake pivot pin or anchor pin 45 is hollow and provided with spaced internal bearings 75 and 76, preferably of the elongated roller or needle bearing type, for rotatably supporting shaft 69. These bearings may be disposed in containers or may be spaced by a suitable collar placed in the space 87. Adjacent bearing 75 and disposed in a shouldered recess in the end of pin 45 is a lubricant sealing assembly 77 surrounding shaft 69. Another lubricant sealing assembly 78 surrounding shaft 69 is disposed in a shouldered recess in pin 45 adjacent the outer end of bearing 76 and abutting an enlarged portion 79 of shaft 69.

The outer end of pin 45 is internally threaded to receive one end of a hollow coupling nut 81 which is externally threaded at both ends. The outer threaded portion 82 of nut 81 is adapted to receive an internally threaded connection at the end of a flexible cable (not shown) and shaft 69 is provided with an extended portion 83 which is shaped to be connected to a shaft within the flexible cable. Since this invention is concerned with the manner of leading the drive out from the wheel, it will be sufficient to point out that any suitable well known means may be used for connecting the end 83 of shaft 69 to the speedometer or other unit which is to be driven.

It is to be noted that collar 79 is positioned between packing 78 and nut 81. This arrangement holds shaft 69 against longitudinal movement.

Lubrication for bearings 75, 76 and 48 is preferably provided in the following manner. A lubricant fitting 84 is threadedly secured at the outer end of an aperture 85 in arm 43 of yoke 41. Passage 86 in the wall of pin 45 provides communication between aperture 85 and space 87 between pin 45 and shaft 69 intermediate needle bearings 75 and 76. Pin 45 is also supplied with a plurality of radial passages 88 for leading lubricant out of space 87 to bearing surface 48 for lubricating the brake shoe pivot. Fitting 84 is provided with an extension 89 to render it conveniently accessible for servicing.

Lubricant forced through fitting 84 under pressure enters space 87 through passage 86 and fills that space to thoroughly lubricate bearings 75 and 76. Escape of lubricant beyond the bearings is prevented by sealing assemblies 77 and 78. After space 87 is filled, however, lubricant is forced through passages 88 to lubricate the exterior surface of pin 45. It will be seen, therefore, that a single lubricant fitting supplies lubrication for both the speedometer drive connection and the brake shoe pivot.

In operation, the steering and braking mechanisms function exactly as they do in known assemblies and no further explanation of the same is deemed necessary. Upon rotation of hub 15, gear 64 drives shaft 69 through pinion 68. Thus rotation of the wheel is transmitted to the speedometer drive connection which is secured to the outer end 83 of shaft 69 without interfering with the mechanisms for controlling the wheel. It is to be understood that this drive can be utilized for other purposes than for a speedometer or odometer.

Although I have described the invention as particularly applicable to a front wheel of the type employing brakes it will be evident that the principle of the invention can be applied to any wheel of a vehicle for driving instruments either on the dashboard or in various portions of the body. Furthermore, the same principle may be utilized for leading a drive out through control mechanisms other than brake mechanism which might be located in the wheel assembly.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a vehicle wheel of the type which is recessed to at least partly house an internal brake assembly, means supported by said brake assembly to drive a meter or the like, and means on said wheel within said recess to drive said latter means in accordance with the rotation of said wheel.

2. In combination with a rotatable wheel, which is recessed to at least partly house an internal brake mechanism a fixed member adapted to support said brake mechanism, a drive connection leading from a portion of said wheel within said recess to a meter or the like exteriorly of said recess, and means to support said drive connection from said fixed member.

3. In combination with a rotatable wheel assembly, a brake drum mounted for rotation with said wheel assembly and extending in spaced relation over a portion of said wheel assembly, internal brake mechanism within said space, and means for rigidly supporting said brake mechanism, said brake mechanism being arranged to cooperate with said brake drum to control rotation of said wheel, means establishing an instrument drive connection leading from said portion of the rotatable wheel to a station exteriorly of said space, and means for conducting said connection through said brake mechanism in such a manner as not to interfere with the operation of the latter.

4. In combination with a rotatable wheel having a recess and a drive assembly accessible within said recess, supporting means extending within said recess and designed to control rotation of said wheel, a conduit carried by said means, and a drive connection for a meter or the like extending through said conduit into said recess to be driven by said drive assembly.

5. In combination with a rotatable wheel having a recess and a drive assembly accessible within said recess, rigid means supporting brake mechanism for said wheel, said brake mechanism extending within said recess, and means including a portion of said rigid means for transmitting motion from said drive formation for driving a meter or the like exteriorly of said recess from said rotatable wheel.

6. In combination with a rotatable wheel having a recess and a drive assembly projecting within said recess, brake means for said wheel extending within said recess, said brake means being provided with a conduit, and means extending from said drive assembly through said conduit for transmitting driving force from said rotatable wheel to a meter or the like exteriorly of said recess.

7. In combination with a rotatable wheel, brake means comprising a pin, a brake element pivotally mounted on said pin, and means supported by said pin for transmitting drive from said wheel to a meter or the like spaced from said wheel.

8. In combination with a rotatable wheel, brake means comprising a hollow pivot member, a drive connection for a meter or the like supported by said pivot member and means for actuating said drive connection upon rotation of said wheel.

9. In combination with a rotatable wheel, brake means for said wheel comprising a hollow pivot member, a shaft rotatably supported by said pivot member arranged to be connected to a meter or the like, and means for connecting said shaft to said wheel to effect rotation of said shaft.

10. In combination with a rotatable wheel, a gear on said wheel, brake mechanism for said wheel comprising a hollow pivot member, a shaft rotatably supported by said pivot member, and a gear at one end of said shaft adapted to mesh with said wheel gear, said shaft being adapted to drive a meter or the like.

11. In combination with a rotatable wheel having an annular recess, brake means within said recess comprising a hollow pivot member adapted to support a brake element, a gear on said wheel disposed within said recess interiorly of said brake means, a shaft journalled in said pivot member and a gear at the inner end of said shaft adapted to mesh with said wheel gear, said shaft being provided at its outer end with a drive connection for a meter or the like.

12. In combination with a rotatable wheel having an annular recess, brake mechanism extending within and substantially occupying said recess, drive means on said wheel disposed within said recess interiorly of said brake mechanism, and a drive connection for a meter or the like extending through said brake mechanism to be driven by the drive means on said wheel.

13. In combination with a rotatable wheel, brake mechanism for said wheel comprising a pin, a brake element on said pin, said pin having an internal bore, a shaft rotatably supported within said bore and means for driving said shaft from said wheel.

14. A brake pivot assembly comprising a hollow pin, a shaft rotatably supported within said pin, and lubricant sealing means between said shaft and said pin at one end of said pin.

15. In combination with a rotatable wheel, brake mechanism for said wheel comprising a hollow pin, a brake element pivoted on said pin, means for driving said shaft from said wheel, a shaft rotatably supported within said pin, means for introducing lubricant within said pin to lubricate said shaft, and a lubricant passage to supply lubricant from within said pin to said brake element.

16. In combination with a rotatable wheel, brake mechanism for said wheel comprising a fixed member having an aperture, a hollow pin adapted to support a brake element secured in said aperture, a shaft rotatably supported upon bearings within said pin and means for driving said shaft from said wheel.

17. In combination with a a rotatable wheel, a gear on said wheel, brake means comprising a hollow pivot member, a shaft for driving a meter or the like rotatably supported by said pivot member, a gear at one end of said shaft adapted to mesh with said wheel gear, said wheel gear and said last mentioned gear each being chamfered at one edge to facilitate assembly.

18. In combination with a rotatable wheel, a gear on said wheel, brake means for said wheel comprising a hollow pivot pin adapted to support a brake element, a shaft extending through said pin and adapted to be connected at its outer end to a drive connection for a meter or the like, a gear secured to the inner end of said shaft adapted to mesh with said wheel gear and spaced needle bearing assemblies within said pin for rotatably supporting said shaft.

19. A vehicle wheel assembly comprising a relatively fixed member, a spindle projecting laterally from said member, a wheel portion having an inwardly disposed annular recess rotatably mounted on said spindle, circumferential support means adjacent the bottom of said recess providing an annular shoulder within said recess, a ring gear secured upon said shoulder projecting into said recess, a web secured to said fixed member, spaced apertured arms on said web, a hollow pin extending between said arms and secured in the apertures thereof, a shaft rotatably supported within said pin, a gear at the inner end of said shaft meshed with said ring gear and a drive connection for a meter or the like at the outer end of said shaft.

RICHARD FARRELL.

CERTIFICATE OF CORRECTION.

Patent No. 2,180,511.  November 21, 1939.

RICHARD FARRELL.

It is hereby certified that the above numbered patent was erroneously issued to the inventor, said "FARRELL" whereas said patent should have been issued to The Timken-Detroit Axle Company, of Detroit, Michigan, a corporation of Ohio, as assignee of the entire interest therein, as shown by the record of assignments in this office; page 1, second column, line 51, beginning with the words "Referring to the drawing" strike out all to and including the word and period "hub." in line 36, first column, page 2; page 4, first column, line 63, claim 11, for "grear" read gear; and second column, line 22, claim 15, strike out the words and comma "means for driving said shaft from said wheel," and insert the same before "means" in line 24, same claim; and that the said Letters Patent should be read with this correction therein that the same may conform to the record of the case in the Patent Office.

Signed and sealed this 23rd day of January, A. D. 1940.

(Seal)

Henry Van Arsdale,
Acting Commissioner of Patents.